(No Model.)

C. R. TURNER.
FIFTH WHEEL.

No. 505,616. Patented Sept. 26, 1893.

WITNESSES:

INVENTOR

BY

ATTORNEYS.

UNITED STATES PATENT OFFICE.

CALEB R. TURNER, OF BROOKLYN, NEW YORK.

FIFTH-WHEEL.

SPECIFICATION forming part of Letters Patent No. 505,616, dated September 26, 1893.

Application filed May 11, 1892. Serial No. 432,647. (No model.)

*To all whom it may concern:*

Be it known that I, CALEB R. TURNER, of Brooklyn, in the county of Kings and State of New York, have invented a new and Improved Fifth-Wheel Bearing, of which the following is a full, clear, and exact description.

My invention relates to improvements in that class of wheels shown in Letters Patent of the United States, No. 289,767, dated December 4, 1883, in which a series of revoluble bearing rollers is held between upper and lower plates, the lower plate being carried by the running gear, and the upper plate supporting the superstructure of the vehicle.

My invention has reference especially to the construction and arrangement of the bearing rollers, and the object of my invention is to cheapen the cost of a fifth wheel in which rollers of this class are used, and also to construct the bearing so that there will be as little friction as possible on the roller bearings.

To this end my invention consists in certain features of construction, and combinations of parts, as will be hereinafter described and then pointed out in the claim.

Reference is to be had to the accompanying drawings forming a part of this specification, in which similar figures of reference indicate corresponding parts in all the views.

Figure 1:
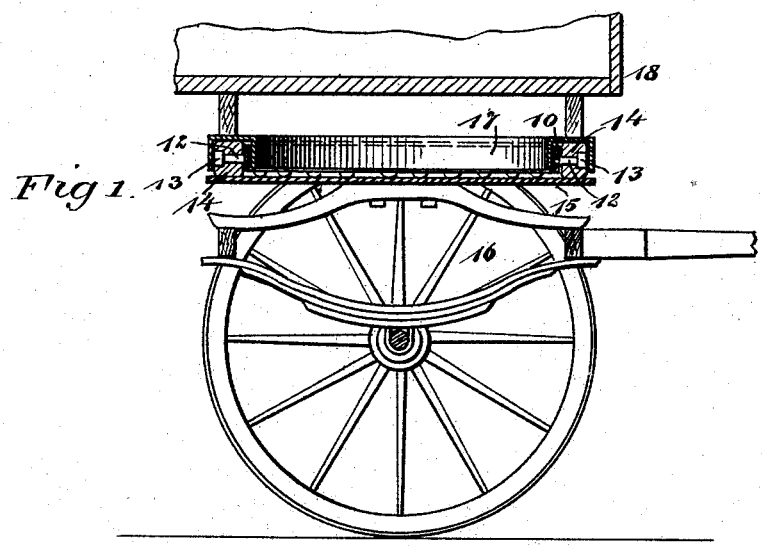
Figure 2:
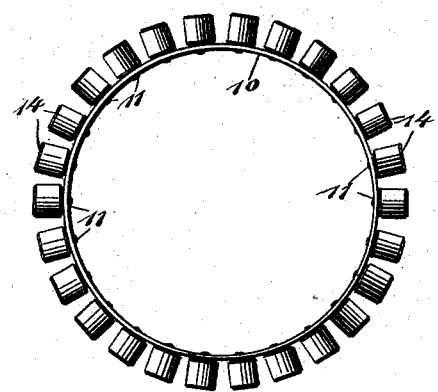

Figure 1 is a cross section of the bearing as applied to a vehicle. Fig. 2 is a detail plan of the bearing; and Fig. 3 is an enlarged detail view showing in longitudinal section, the construction of a roller and its bearing.

Figure 3:
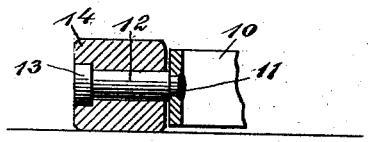

My invention comprises the construction shown in detail in Figs. 2 and 3, and the frame of the bearing consists of a ring 10, which is preferably flat, and projecting radially from the outer side of this ring and riveted to the ring, as shown at 11 in Fig. 3, are bearing studs 12, having enlarged heads 13, and each stud has journaled loosely thereon, a roller 14, the outer end of the roller being countersunk, so that its end face will be flush with the outer end of the stud 12. This construction enables the bearing to be very cheaply made, as the studs may be easily riveted to the ring and the rollers may be cheaply bored to fit the studs.

By reference to the patent above referred to, as well as to other patents in the same class, it will be seen that the fifth wheel bearing rollers have heretofore been constructed with integral end trunnions, which form the bearings of the rollers, and rollers of this class cannot be as cheaply made as the rollers above described, and moreover, where rollers are provided with end trunnions it necessitates a bearing for each end of the rollers, whereas in the construction described above, only one ring 10 is necessary.

In Fig. 1, I have illustrated the application of the bearing, and here the rollers are shown as supported on a bearing plate 15, which is carried by the running gear 16, of a vehicle in the usual way, and resting upon the upper surfaces of the rollers is a channel plate 17, which carries the superstructure 18, of the vehicle. It is not necessary, however, that the bearing embodying my invention be used with the form of plates shown in Fig. 1, as any suitable plates adapted to form a support for and to rest upon the rollers may be employed. It will also be understood that while this bearing is especially intended for a fifth wheel bearing, it may be used for other purposes where a circular bearing is necessary.

Having thus fully described my invention, I claim as new and desire to secure by Letters Patent—

The combination in a roller bearing of a single ring having a circular series of studs secured exteriorly thereto, and supported therefrom by one end only, and rollers held to turn on the studs, the latter having their outer free ends enlarged to retain the rollers in place, and a circular channel-iron fitting over said rollers and forming a support for a superstructure, substantially as described.

CALEB R. TURNER.

Witnesses:
WARREN B. HUTCHINSON,
EDGAR TATE.